(12) United States Patent
Cash et al.

(10) Patent No.: US 10,792,883 B2
(45) Date of Patent: Oct. 6, 2020

(54) COATED CONDUITS AND METHODS OF REPAIRING OR REINFORCING CONDUITS

(71) Applicant: PPG Coatings Europe B.V., Amsterdam (NL)

(72) Inventors: Brandon Cash, Moore, NC (US); Cynthia Kutchko, Pittsburgh, PA (US); Howard L. Senkfor, South Euclid, OH (US); Edward R. Millero, Jr., Gibsonia, PA (US); Kurt G. Olson, Gibsonia, PA (US); James C. Watson, Clover, SC (US)

(73) Assignee: PPG Coatings Europe B.V., Amsterdam (NL)

( * ) Notice: Subject to any disclaimer, the term of this patent is extended or adjusted under 35 U.S.C. 154(b) by 0 days.

(21) Appl. No.: 16/326,268

(22) PCT Filed: Aug. 17, 2017

(86) PCT No.: PCT/EP2017/070811
§ 371 (c)(1),
(2) Date: Feb. 18, 2019

(87) PCT Pub. No.: WO2018/033589
PCT Pub. Date: Feb. 22, 2018

(65) Prior Publication Data
US 2019/0185702 A1    Jun. 20, 2019

Related U.S. Application Data

(60) Provisional application No. 62/375,962, filed on Aug. 17, 2016.

(51) Int. Cl.
| | |
|---|---|
| *B32B 1/08* | (2006.01) |
| *F16L 58/10* | (2006.01) |
| *F16L 59/15* | (2006.01) |
| *C09D 7/40* | (2018.01) |
| *B32B 5/02* | (2006.01) |
| *F16L 1/26* | (2006.01) |
| *C09D 7/62* | (2018.01) |
| *C09D 175/02* | (2006.01) |

(52) U.S. Cl.
CPC .................. *B32B 1/08* (2013.01); *B32B 5/02* (2013.01); *C09D 7/62* (2018.01); *C09D 7/70* (2018.01); *C09D 175/02* (2013.01); *F16L 1/26* (2013.01); *F16L 58/10* (2013.01); *F16L 58/1009* (2013.01); *F16L 58/1054* (2013.01); *F16L 59/15* (2013.01)

(58) Field of Classification Search
CPC .... B32B 1/08; B32B 5/02; F16L 58/10; F16L 58/1009; F16L 58/1054; F16L 59/15
See application file for complete search history.

(56) References Cited

U.S. PATENT DOCUMENTS

2010/0003211 A1* 1/2010 Sakamoto ............ C09D 183/04
424/78.09

FOREIGN PATENT DOCUMENTS

| DE | 102012109686 A1 | 4/2013 |
| RU | 2107216 C1 | 3/1998 |
| RU | 2201549 C2 | 3/2003 |

OTHER PUBLICATIONS

The International Search Report and the Written Opinion of the International Searching Authority for International Application No. PCT/EP2017/070811, 12 pages.

* cited by examiner

*Primary Examiner* — Walter Aughenbaugh
(74) *Attorney, Agent, or Firm* — Krisanne Shideler

(57) ABSTRACT

The present invention is directed to a coated conduit comprising: a) a conduit having an interior and exterior surface; and b) a cured coating formed from a reaction mixture that is applied to at least one surface of the conduit. The reaction mixture comprises: i) a filler material comprising fibers ranging in length from 0.1 to 15.54 cm and having an aspect ratio of at least 5; and ii) a reactive component that demonstrates a tack-free time of less than five minutes at a temperature of 20 to 25° C. The present invention is also directed to a method of repairing or reinforcing a conduit, comprising: (a) applying a curable coating composition to at least one surface of the conduit, wherein the curable coating composition is formed from the reaction mixture described above; and (b) allowing the curable coating composition to at least partially cure by exposing the composition to ambient conditions.

20 Claims, No Drawings

COATED CONDUITS AND METHODS OF REPAIRING OR REINFORCING CONDUITS

CROSS-REFERENCE TO RELATED APPLICATION

This application claims priority from provisional U.S. Patent Application Ser. No. 62/375,962, filed Aug. 17, 2016, and entitled "COATED CONDUITS AND METHODS OF REPAIRING OR REINFORCING CONDUITS", which is incorporated herein by reference in its entirety.

FIELD OF THE INVENTION

The present invention relates to coated conduits and methods of repairing or reinforcing conduits.

BACKGROUND OF THE INVENTION

Industrial and municipal conduits such as ductwork or pipelines that are employed for transporting fluids, particularly oil pipelines and underground pipes such as sanitary sewer pipes, storm sewer pipes, water supply lines and gas supply lines, often require reinforcement or repair due to damage. It is important to avoid leakage either into or out of the conduit to avoid contamination of either the fluid being conveyed or the surrounding environment.

Damage or leakage may be due to improper installation of the original pipe or deterioration of the pipe itself after normal aging, or caused by the effects of conveying corrosive, erosive, or abrasive material. Cracks in underground pipes may be due to environmental events such as stresses and vibrations caused by the movement of large vehicles on the surface above or similar man made or natural vibrations, even earthquakes. Regardless of the cause, such leakages are undesirable because they may result in contamination or waste of the fluid being conveyed within the pipeline, or damage to the surrounding soil or ground water, causing a possible public health hazard. If the damage is not repaired it can lead to structural failure of the existing conduit.

Because of the time and expense involved with digging up and replacing pipes, methods for repairing existing pipes in situ are desired.

SUMMARY OF THE INVENTION

The present invention is directed to a coated conduit, comprising:
a) a conduit having an interior and exterior surface; and
b) a cured coating formed from a reaction mixture that is applied to at least one surface of the conduit. The reaction mixture comprises:
i) a filler material comprising reinforcing fibers ranging in length from 0.1 to 15.54 cm and having an aspect ratio of at least 5; and
ii) a reactive component that demonstrates a tack-free time of less than five minutes at a temperature of 20 to 25° C.

The present invention is also directed to a method of repairing or reinforcing a conduit, comprising:
(a) applying a curable coating composition to at least one surface of the conduit, wherein the curable coating composition is formed from the reaction mixture described above; and
(b) allowing the curable coating composition to at least partially cure by exposing the composition to ambient conditions.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. As used in this specification and the appended claims, the articles "a," "an," and "the" include plural referents unless expressly and unequivocally limited to one referent. For example, "a filler material" as recited in the claims may refer to one or more filler materials.

The conduit used as a substrate in the coated conduit of the present invention has an interior and exterior surface, and may have a round cross section, as in a pipe, or a square or rectangular cross section such as in a duct. Typically the conduit is an existing oil pipeline or underground pipe such as a sanitary sewer pipe, storm sewer pipe, water supply line or gas supply line, made of conventional materials such as metals including copper, concrete, PVC, CPVC, or cross-linked polyethylene.

The coated conduit of the present invention further comprises a cured coating formed from a reaction mixture that is applied to at least one surface of the conduit, i. e., the interior and/or exterior surface. The reaction mixture comprises i) a filler material and ii) a reactive component.

The filler material i) comprises fibers and serves as a structural reinforcement to the cured coating. The filler material may comprise any structurally reinforcing fiber, but typically comprises chopped glass fibers, carbon fibers, and/or cellulose. Note that the phrase "and/or" when used in a list is meant to encompass alternative embodiments including each individual component in the list as well as any combination of components. For example, the list "A, B, and/or C" is meant to encompass seven separate embodiments that include A, or B, or C, or A+B, or A+C, or B+C, or A+B+C. The fibers may range in length from 0.1 to 15.54 cm, such as 0.1 to 0.2 cm, or 0.634 to 2.54 cm. Length measurement may be done manually, such as with a ruler. The fibers also demonstrate an aspect ratio of at least 5. By "aspect ratio" is meant the ratio of the length of the fiber to the width of the fiber. Any known reinforcing fibers may be used in the reaction mixture used to form the cured coating.

The fibers can be in any form, and can be coated with a sizing and/or uncoated. For example, glass fibers may comprise corrosion resistant glass fibers or they may be coated with a sizing. Examples of suitable sizings include HYDROSIZE and FGLASS sizings available from Michelman, Inc. An exemplary sizing is described in the Examples below.

The filler material i) is typically present in the reaction mixture in an amount of 1 to 50 percent by weight, such as a minimum amount of 1 percent by weight, or 2.5 percent by weight, or 10 percent by weight, or 15 percent by weight, and a maximum amount of 50 percent by weight, or 40 percent by weight, or 30 percent by weight, based on the total weight of resin solids in the reaction mixture.

The reactive component ii) demonstrates a tack-free time of less than 5 minutes, such as less than 4 minutes, at a temperature of 20 to 25° C. By "tack-free time" is meant the amount of time between application of the reaction mixture to a substrate as coating, and, upon placing a cotton ball onto the coated surface, removing the cotton ball from the surface without leaving a mark or residue. When the cotton ball no longer sticks to, or must be pulled from, the surface of the layer, the layer is said to be substantially tack-free. A time beginning from the completion of applying the composition on a surface, e.g. by spraying, until when the coating is substantially tack-free is said to be the tack-free time.

The reactive component ii) may include a first compound ("coreactive component") having at least two functional groups per molecule (referred to as the "A" functional groups) and a second compound ("coreactive component") having at least two functional groups per molecule (referred to as the "B" functional groups), where the A functional groups and the B functional groups are coreactive with each other and are different from each other. B functional groups may be capable of reacting with the A functional groups at moderate temperature such as less than 100° C., less than 60° C., less than 50° C., less than 40° C., less than 30° C., or less than 25° C. The A and B functional groups may react together at room temperature such as 20° C. One or both of the coreactive components may have on average more than two reactive groups per molecule.

For example, the reactive component ii) may comprise:
(i) a) an isocyanate functional compound and b) an amine functional compound;
(ii) a) an isocyanate functional compound and b) a hydroxyl and/or thiol functional compound;
(iii) a) an acid-functional compound and b) an epoxide functional compound;
(iv) a) an ethylenically unsaturated compound and b) an amine functional compound;
(v) a) cyclic carbonate functional compound and b) an amine functional compound;
(vi) a) an acetoacetate functional compound and b) an amine functional compound;
(vii) a) an epoxide functional compound and b) an amine functional compound;
(viii) a) a thiol functional compound and b) an ethylenically unsaturated compound; or
(ix) a) an ethylenically unsaturated compound and b) a malonate functional compound. Ethylenically unsaturated compounds may include alkenyl functional compounds, (meth)acrylate functional compounds, vinyl ethers, and the like.

A first coreactive component may include compounds having more than one type of functional group A, and/or the second coreactive component may include components having more than one type of functional group B, such that the reactive mixture can comprise at least two sets of coreactive A and B groups. For example, a first coreactive component may have hydroxyl groups and secondary amine groups (i.e. at least two different functional groups) and the second coreactive component may have isocyanate groups. One or both of the coreactive components may optionally include a catalyst for the reaction between the A groups and the B groups. The A groups and the B groups may be attached to any suitable compound such as a monomer and/or a prepolymer. Optionally, the A groups and the B groups may be attached to an oligomer, polymer, or prepolymer such as polyester, polyurethane, or acrylic oligomer, polymer, or prepolymer. In the disclosure of the present invention, by "polymer" is meant a polymer including homopolymers and copolymers. By "composite material" is meant a combination of two or more differing materials. In general, monomers refer to compounds without repeating units in the backbone, and can be characterized, for example, by a molecular weight less than 600 Daltons, less than 500 Daltons, or less than 400 Daltons. In general, a prepolymer refers to a compound having repeat units in backbone and can be characterized, for example, by a molecular weight from 1,000 Daltons to 20,000 Daltons, from 1,000 Daltons to 10,000 Daltons, or from 2,000 Daltons to 5,000 Daltons. As used herein, polymer or oligomer molecular weight is determined by gel permeation chromatography (GPC) using appropriate standards, in many cases polystyrene or sulfonated polystyrene. Unless otherwise indicated, molecular weight refers to number average molecular weight ($M_n$).

The functional groups A and B may be terminal groups and/or pendent groups. A coreactive component can have a functionality of at least two, such as a functionality from 2 to 6. Each functional group of a coreactive component can be the same or certain functional groups of a coreactive component can be different. For example, a coreactive component can have more than one different type of functional group reactive with an isocyanate, such as a primary amine group, a secondary amine group, or a hydroxyl group.

In a reactive component ii) comprising at least two coreactive components, the first component can comprise a polyamine and the second component can comprise a polyisocyanate; the first component can comprise a polyalkenyl compound and the second component can comprise a polythiol; the first component can comprise a Michael addition acceptor and the second component can comprise a Michael addition donor; or a combination of any of the foregoing. In a composition comprising at least two coreactive components, the first component can comprise an isocyanate-functional prepolymer; and the second functional group can comprise a primary amine, a secondary amine, a hydroxyl, or a combination of any of the foregoing.

Reactive component compositions ii) provided by the present disclosure may include more than two coreactive components. A reactive component can comprise a combination of reactive components having the same functional group, such as a combination of monomers and prepolymers having the same functional group. An additional coreactive component can comprise a compound having a different functional group reactive with a first functional group or the second functional group.

A reactive component composition ii) provided by the present disclosure can be based on thiol-ene chemistry. For example, a reactive component ii) having thiol-ene functionality may include a polyene coreactive component comprising compounds or prepolymers having terminal and/or pendent olefinic double bonds, such as terminal alkenyl groups. Examples of such compounds include (meth) acrylic-functional (meth)acrylic copolymers, epoxy acrylates such as epoxy resin (meth)acrylates (such as the reaction product of bisphenol A diglycidyl ether and acrylic acid), polyester (meth)acrylates, polyether (meth)acrylates, polyurethane (meth)acrylates, amino (meth)acrylates, silicone (meth)acrylates, and melamine (meth)acrylates.

Examples of suitable polyurethane (meth)acrylates include reaction products of polyisocyanates such as 1,6-hexamethylene diisocyanate and/or isophorone diisocyanate including isocyanurate and biuret derivatives thereof with hydroxyalkyl (meth)acrylates such as hydroxyethyl (meth)acrylate and/or hydroxypropyl (meth)acrylate. Examples of suitable polyester (meth)acrylates are the reaction products of (meth)acrylic acid or anhydride with polyols, such as dials, trials and tetraols, including alkylated polyols, such as propoxylated diols and trials. Examples of suitable polyols include 1,4-butane diol, 1,6-hexane dial, neopentyl glycol, trimethylol propane, pentaerythritol and propoxylated 1,6-hexane diol.

Examples of suitable polyester (meth)acrylates include glycerol tri(meth)acrylate, trimethylolpropane tri(meth)acrylate, pentaerythritol tri(meth)acrylate, and pentaerythritol tetra(meth)acrylate. Mixtures of polyurethane (meth)acrylates, and polyester (meth)acrylates may be used.

In addition to (meth)acrylates, (meth)allyl compounds may be used either alone or in combination with (meth)acrylates. Examples of (meth)allyl compounds include polyallyl ethers such as the diallyl ether of 1,4-butane diol and the allyl ether of trimethylol propane. Examples of other (meth)allyl compounds include polyurethanes containing (meth)allyl groups. For example, reaction products of polyisocyanates such as 1,6-hexamethylene diisocyanate and/or isophorone diisocyanate including isocyanurate and biuret derivatives thereof with hydroxy-functional allyl ethers, such as the monoallyl ether of 1,4-butane diol and the diallylether of trimethylol propane can be used.

Isocyanate functionality may be incorporated into a coreactive component in a number of ways. The polyurethane (meth)acrylate or the polyurethane (meth)allyl compound may be prepared in a manner such that the reaction product contains unreacted isocyanate groups. For example, the above-mentioned reaction product of 1,6-hexamethylene diisocyanate and/or isophorone diisocyanate with hydroxyethyl (meth)acrylate and/or hydroxypropyl (meth)acrylate are reacted in an NCO/OH equivalent ratio of greater than 1. Alternately, such reaction products may be prepared such that they are isocyanate free, i.e., NCO/OH equivalent ratio equal to or less than 1, and a separate isocyanate compound such as a polyisocyanate may be included in the coreactive component.

A polythiol coreactive component refers to polyfunctional compounds containing two or more thiol-functional groups (—SH). Suitable polythiol-functional compounds include polythiols having at least two thiol groups including monomers and prepolymers. A polythiol may have ether linkages (—O—), thioether linkages (—S—), including polysulfide linkages (—S$_x$—), where x is at least 2, such as from 2 to 4, and combinations of such linkages.

Examples of suitable polythiols include compounds of the formula R$^1$—(SH)$_n$, where R$^1$ is a polyvalent organic moiety and n is an integer of at least 2, such as from 2 to 6.

Examples of suitable polythiols include esters of thiol-containing acids formed by reacting a thiol-containing acid of formula HS—R$^2$—COOH where R$^2$ is an organic moiety with a polyhydroxy compound of the structure R$^3$—(OH)$_n$ where R$^3$ is an organic moiety and n is at least 2, such as from 2 to 6. These components may be reacted under suitable conditions to give polythiols having the general structure:

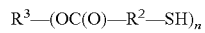

R$^3$—(OC(O)—R$^2$—SH)$_n$ wherein R$^2$, R$^3$ and n are as defined above.

Examples of thiol-containing acids include thioglycolic acid (HS—CH$_2$COOH), α-mercaptopropionic acid (HS—CH(CH$_3$)—COOH) and β-mercaptopropionic acid (HS—CH$_2$CH$_2$COOH) with polyhydroxy compounds such as glycols, triols, tetraols, pentaols, hexaols, and mixtures thereof. Other suitable polythiols include ethylene glycol bis(thioglycolate), ethylene glycol bis(χ-mercaptopropionate), trimethylolpropane tris (thioglycolate), trimethylolpropane tris (β-mercaptopropionate), pentaerythritol tetrakis (thioglycolate) and pentaerythritol tetrakis (β-mercaptopropionate), and mixtures thereof.

Certain cured coatings provided by the present disclosure may be prepared from Michael addition reactive components. The reactive components may include primary amine-functional components and acrylate, maleic, or fumaric-functional components. Compounds that are useful primary amine-functional components include polyoxyalkyleneamines containing two or more primary amine groups attached to a backbone, derived, for example, from propylene oxide, ethylene oxide, or a mixture thereof. Examples of such amines include those available under the designation JEFFAMINE™ from Huntsman Corporation. Such amines can have a molecular weight ranging from 200 Daltons to 7500 Daltons, such as, for example, JEFFAMINE™ D-230, D-400, D-2000, T-403, and T-5000. Compounds useful as acrylate functional components include the acrylate functional components listed previously as examples of (poly) methacrylate. Compounds useful as maleic or fumaric components include polyesters prepared from maleic anhydride, maleic acid, fumaric acid, or their corresponding C$_1$-C$_6$ alkyl esters.

A Michael acceptor group refers to an activated alkenyl group such as an alkenyl group proximate to an electron-withdrawing group such as a ketone, nitro, halo, nitrile, carbonyl, or nitro group. Examples of Michael acceptor groups include vinyl ketone, vinyl sulfone, quinone, enamine, ketimine, aldimine, oxazolidine, acrylate, acrylate esters, acrylonitrile, acrylamide, maleimide, alkylmethacrylates, vinyl phosphonates, and vinyl pyridines.

Suitable examples of catalysts for Michael addition chemistries include tributylphosphine, triisobutylphosphine, tri-tertiary-butylphosphine, trioctyl phosphine, tris(2,4,4-trim-ethylpentyl)phosphine, tricyclopentylphosphine, tricyclohexalphosphine, tri-n-octylphosphine, tri-n-dodecylphosphine, triphenyl phosphine, and dimethyl phenyl phosphine.

The reactive component ii) in the reaction mixture may comprise a) an isocyanate-functional compound and b) an amine-functional compound to form a polyurea upon curing.

The isocyanate functional compound a) may be a monomeric polyisocyanate, a polyisocyanate prepolymer as described above, or a blend of polyisocyanates; e.g., a blend of one or more polyisocyanate prepolymers and/or one or more monomeric polyisocyanates. Suitable isocyanate functional compounds include isophorone diisocyanate (IPDI), which is 3,3,5-trimethyl-5-isocyanato-methyl-cyclohexyl isocyanate; hydrogenated (i. e., saturated) materials such as cyclohexylene diisocyanate, 4,4'-methylenedicyclohexyl diisocyanate (H$_{12}$MDI); mixed aralkyl diisocyanates such as tetramethylxylyl diisocyanates, OCN—C(CH$_3$)$_2$—C$_6$H$_4$C(CH$_3$)$_2$—NCO; and polymethylene isocyanates such as 1,4- tetramethylene diisocyanate, 1,5-pentamethylene diisocyanate, 1,6-hexamethylene diisocyanate (HMDI), 1,7-heptamethylene diisocyanate, 2,2,4-and 2,4,4-trimethylhexamethylene diisocyanate, 1,10-decamethylene diisocyanate and 2-methyl-1,5-pentamethylene diisocyanate. Aliphatic isocyanates and/or aromatic polyisocyanates may be used depending on the nature of the fluid that is transported through the conduit being repaired. Non-limiting examples of aromatic polyisocyanates include phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate and alkylated benzene diisocyanates generally; methylene-interrupted aromatic diisocyanates such as methylenediphenyl diisocyanate, especially the 4,4'-isomer (MDI) including alkylated analogs such as 3,3'-dimethyl-4,4'-diphenylmethane diisocyanate and polymeric methylenediphenyl diisocyanate.

The use of various oligomeric polyisocyanates (e.g., dimers, trimers, polymeric, etc.) and modified polyisocyanates (e.g., carbodiimides, uretone-imines, etc.) is also within the scope of the invention. Often, the isocyanate-functional compound comprises a prepolymer prepared from a polyetheramine, such as any of the polyoxyalkylene amines described above, and/or a polyether polyol chain extended with a polyisocyanate. Exemplary polyether polyols include polyalkylene glycol polyols. The polyisocyanate used for the chain extension usually comprises a monomeric polyisocyanate such as isophorone diisocyanate.

Amine functional compounds suitable for use in the reactive components may be primary, secondary, tertiary amines or mixtures thereof. The amines may be monoamines, or polyamines such as diamines, triamines, higher polyamines and/or mixtures thereof. The amines also may be aromatic or aliphatic (e.g., cycloaliphatic). The amine typically is provided as a liquid having a relatively low viscosity (e.g., less than about 100 mPa·s at 25° C. using a Brookfield viscometer). In one example no primary amine is present in the amine component. In a particular example, the amine component comprises a mixture of primary and secondary amines. If a mixture of primary and secondary amines is employed, the primary amine can be present in an amount of 15 to 80 percent by weight or 20 to 50 percent by weight, with the balance being secondary amines. Although others can be used, primary amines present in the composition generally have a molecular weight greater than 200 (e.g., for reduced volatility), and secondary amines present generally comprise diamines with molecular weights of at least 190 (e.g., 210-230).

Often, the amine-functional component includes at least one secondary amine present in an amount of 20 to 85 percent by weight or 50 to 80 percent by weight. Suitable secondary amines can include acrylate and methacrylate modified amines. By "acrylate and methacrylate modified amines" is meant both mono-and poly-acrylate modified amines as well as acrylate or methacrylate modified mono-or poly-amines. Such acrylate or methacrylate modified amines may be prepared from aliphatic polyamines. Examples of suitable aliphatic polyamines include, without limitation, ethylene diamine, 1,3-bis(aminomethyl)diamine, 1,2-diaminopropane, 1,4-diaminobutane, 1,5-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane, or mixtures thereof. A particular example of an acrylate modified amine is a reaction product of isophorone diamine, dibutyl maleate, and butyl acrylate.

Secondary amines may include an aliphatic amine, such as a cycloaliphatic diamine. Such amines are available commercially from Huntsman Corporation (Houston, Tex.) under the designation of JEFFLINK™ such as JEFFLINK™ 754. Others include CLEARLINK 1000 (Dorf-Ketal Chemicals, LLC), and aspartic ester functional amines, such as those available under the name DESMOPHEN such as DESMOPHEN NH1220, DESMOPHEN NH 1420, and DESMOPHEN NH 1520 (Covestro LLC). Alternatively, the secondary amine can be the reaction product of isophorone diamine and acrylonitrile, such as POLYCLEAR 136 (available from BASF/Hansen Group LLC). The amine can also be provided as an amine-functional resin. For example, the amine-functional resin may comprise an ester of an organic acid, such as an aspartic ester-based amine-functional reactive resin that is compatible with isocyanates; e.g., one that is solvent-free, and/or has a mole ratio of amine-functionality to the ester of no more than 1:1 so there remains no excess primary amine upon reaction. One example of such polyaspartic esters is the derivative of diethyl maleate and 1,5-diamino-2-methylpentane, available commercially from Covestro LLC of Pittsburgh, Pa. under the trade name DESMOPHEN NH1220. Other suitable compounds containing aspartate groups may be employed as well.

Additionally, the secondary polyamines can include polyaspartic esters which can include derivatives of compounds such as maleic acid, fumaric acid esters, aliphatic polyamines and the like.

The amine-functional compound also may include high molecular weight primary amines, such as polyoxyalkyleneamines. The polyoxyalkyleneamines contain two or more primary amino groups attached to a backbone, derived, for example, from propylene oxide, ethylene oxide, or a mixture thereof. Examples of such amines include those available under the designation JEFFAMINE™ from Huntsman Corporation. Such amines typically have a molecular weight ranging from 200 to 7500, such as, without limitation, JEFFAMINE D-230, D-400, D-2000, T-403 and T-5000.

The ratio of equivalents of "A" functional groups to "B" functional groups may be selected to control the rate of cure of the reaction mixture, thereby affecting adhesion. For example, it has been found that two-component polyurea compositions capable of being produced, or capable of being applied to the substrate, in a 1:1 volume ratio have advantages particularly in curing and adhesion to the conduit surface when the ratio of the equivalents of isocyanate groups to amine groups (also known as the reaction index) is greater than one, such as 1.01 to 1.25:1, or 1.20 to 1.25:1. "Being capable of being produced in a 1:1 volume ratio" or "capable of being applied to the substrate in a 1:1 volume ratio" means that the volume ratio can vary by up to 20% for each component, or up to 10% or up to 5%; e.g. 0.8:1 to 1.2:1, 0.9:1 to 1.1:1, or 0.95:1 to 1.05:1. The isocyanate-functional compound and the amine-functional compound can be selected from any of the isocyanates (including polyisocyanates) and amines listed above to provide a reaction index that is greater than one, while being capable of being applied in a 1:1 volume ratio and acceptable performance of the resulting coating.

The reaction mixture can include various additives such as rheology modifiers (e.g., silica or other particulate fillers), flow control agents, plasticizers, stabilizers, wetting agents, dispersing auxiliaries, defoamers, pigments and other colorants, fire retardants, adhesion promoters, catalysts or other performance or property modifiers such as barium sulfate, clay or magnesium compounds as required to impart barrier or corrosion resistance properties.

The filler material and coreactive components of the reaction mixture are typically kept in separate packages until immediately prior to application to the conduit. The reaction mixture may be prepared using a two-component mixing device. For example, the polyurea reaction mixtures may be prepared using a high pressure impingement mixing device in which equal volumes of an isocyanate-functional compound and an amine-functional compound are impinged upon each other and immediately sprayed onto at least a portion of the substrate, along with a third sprayed stream providing the filler material. The isocyanate-functional compound and the amine-functional compound react to produce a polyurea composition which is cured upon application to the substrate. High-pressure impingement mixing, such as 500 to 3000 psig is particularly useful in preparing coatings from polymeric systems that have very fast reaction kinetics.

One example of a commercially available mixing device is a GUSMER™ VR-H-3000 proportioner fitted with a GRACO/GUSMER™ Model GX-7 spray gun. In that device, pressurized streams of components of the A-side and the B-side are delivered from two separate chambers of a proportioner and are impacted or impinged upon each other at high velocity to effectuate an intimate mixing of the two components, which is coated onto the desired substrate via the spray gun. During mixing, the components are atomized and impinged on each other at high pressure. Superior control of the reaction is achieved when the forces of the component streams are balanced. The mixing forces experienced by the component streams are determined by the volume of each stream entering the mixing chamber per unit time and the pressure at which the component streams are delivered. A 1:1 volume ratio of the coreactive components per unit time serves to equalize those forces.

The reactive component ii) demonstrates a tack-free time of less than 5 minutes, such as less than 4 minutes, at a temperature of 20 to 25° C. The tack-free time and the cure time for a polyurea composition may be controlled by balancing the amounts of various composition components As mentioned above, the reaction mixture can optionally include a silica, such as fumed silica. Any suitable silica can be used, so long as it is a suitable thixotrope that does not compromise application and coating performance properties.

When present, the silica is present in the reaction mixture at a level of at least 0.5 percent by weight, in some cases at least 1 percent by weight and in other cases at least 1.5 percent by weight, based on the total weight of resin solids in the reaction mixture. Also, the silica can be present at up to 6 percent by weight, in some cases up to 5 percent by weight, and in other cases up to 4 percent by weight of the composition, based on the total weight of resin solids in the reaction mixture. The amount of silica in the reaction mixture can be any value or range between any values recited above, provided the adhesion properties and application viscosity of the reaction mixture are not adversely affected.

The reaction mixture may include an adhesion promoter for enhancing adhesion of the cured coating to the conduit surface. The adhesion promoter may be provided with either or both of the coreactive components. Alternatively, the adhesion promoter may be applied as a separate layer directly to the conduit surface prior to application of the reaction mixture thereto. When applied as a separate layer, the adhesion promoter may be dispersed or dissolved in a carrier such as an organic solvent or water which is evaporated prior to application of the reaction mixture. The adhesion promoter may be applied by wiping, dipping, roll coating, curtain coating, spraying or other application techniques as are well known in the art.

Examples of suitable adhesion promoters for polyurea reaction mixtures include amines (such as tertiary amines or melamines), amino silanes, isocyanate-functional silanes, metal complexes and urethane acrylate compositions. The underlying mechanism which enhances adhesion of the polyurea coating to the substrate by the adhesion promoter may involve one or more phenomena such as but not limited to catalysis of a reaction between reactive groups on the substrate or previously applied coating (e.g. hydroxyl groups) and functional groups of the polyurea composition, reaction with the substrate or bonding with the substrate such as via hydrogen bonding.

Suitable tertiary amines for use as adhesions promoters include 1,5-diazabicyclo[4.3.0]non-5-ene, 1,8-diazabicyclo[5.4.0]undec-7-ene, 1,4-diazabicyclo[2.2.2]octane, 1,5,7-triazabicyclo[4.4.0]dec-5-ene, and 7-methyl-1,5,7-triazabicyclo[4.4.0]dec-5-ene. An example of an amino silane for use as an adhesion promoter is γ-aminopropyltriethoxysilane (commercially available as SILQUEST A100 from OSY Specialties, Inc.). Other suitable amine-functional adhesion promoters include 1,3,4,6,7,8-hexahydro-2H-pyrimido-(1,2-A)-pyrimidine, hydroxyethyl piperazine, N-aminoethyl piperizine, dimethylamine ethylether, tetramethyliminopropoylamine (commercially available as POLYCAT® 15 from Air Products and Chemicals, Inc.), blocked amines such as an adduct of IPDI and dimethylamine, a melamine such as melamine itself or an imino melamine resin (e.g. CYMEL® 220 or CYMEL® 303, available from Cytec Industries Inc.). Metal-containing adhesion promoters may include metal chelate complexes such as an aluminum chelate complex (e.g. K-Kat 5218 available from King Industries) or tin-containing compositions such as stannous octoate and organotin compounds such as dibutyltin dilaurate and dibutyltin diacetate. Other adhesion promoters may include salts such as chlorine phosphate, butadiene resins such as an epoxidized, hydroxyl terminated polybutadiene resin (e.g. Poly bd® 605E available from Atofina Chemicals, Inc.), polyester polyols (e.g. CAPA® 3091, a polyester triol available from Solvay America, Inc.), and urethane acrylate compositions such as an aromatic urethane acrylate oligomer (e.g. CN999 available from Sartomer Company, Inc.).

The present invention is also directed to a method of repairing or reinforcing a conduit, comprising:
(a) applying a curable coating composition to at least one surface of the conduit; and
(b) allowing the curable coating composition to at least partially cure; i. e., to at least begin curing by chemical reaction of reactive functional groups in the composition, by exposing the composition to ambient conditions. The method is particularly useful for repairing, refurbishing, or reinforcing an existing conduit in situ, allowing for convenient, on-site, cured-in-place rehabilitation. For instance, the curable coating composition may be applied by spraying. Herein, a high pressure mixing device as described above may be used to prepare the curable coating composition from the filler material and the coreactive components immediately before spraying it onto the surface of the conduit.

The curable coating composition useful in the method of the present invention may be prepared from any of the reaction mixtures described above, and applied to the interior and/or exterior surface of the conduit using application procedures as described. The reaction mixtures are curable under ambient conditions. By "ambient conditions" is meant surrounding conditions without the application of heat or other energy; for example, when a curable composition undergoes a thermosetting reaction without baking in an oven, use of forced air, irradiation, or the like to prompt the reaction, the reaction is said to occur under ambient conditions. Usually ambient temperature ranges from 60 to 90° F. (15.6 to 32.2° C.), such as a typical room temperature, 72° F. (22.2° C.), but outdoor temperatures as low as 25° F. are suitable.

Each of the characteristics and examples described above, and combinations thereof, may be said to be encompassed by the present invention. The present invention is thus drawn to the following nonlimiting aspects:

1. A coated conduit, comprising:
   a) a conduit having an interior and exterior surface; and
   b) a cured coating formed from a reaction mixture that is applied to at least one surface of the conduit, wherein the reaction mixture comprises:
   i) a filler material comprising fibers ranging in length from 0.1 to 15.54 cm and having an aspect ratio of at least 5; and
   ii) a reactive component that demonstrates a tack-free time of less than five minutes at a temperature of 20 to 25° C.

2. The coated conduit according to aspect 1, wherein the conduit comprises an underground pipe.

3. The coated conduit according to any of aspects 1 to 2, wherein the reaction mixture is applied to the interior surface of the conduit.

4. The coated conduit according to any of aspects 1 to 3, wherein the reaction mixture is applied to the exterior surface of the conduit.

5. The coated conduit according to any of aspects 1 to 4, wherein the reactive component comprises:
   (i) a) an isocyanate functional compound and b) an amine functional compound;
   (ii) a) an isocyanate functional compound and b) a hydroxyl functional compound;
   (iii) a) an acid-functional compound and b) an epoxide functional compound;
   (iv) a) an ethylenically unsaturated compound and b) an amine functional compound;
   (v) a) cyclic carbonate functional compound and b) an amine functional compound;
   (vi) a) an acetoacetate functional compound and b) an amine functional compound;
   (vii) a) an epoxide functional compound and b) an amine functional compound;
   (viii) a) a thiol functional compound and b) an ethylenically unsaturated compound; or
   (ix) a) an ethylenically unsaturated compound and b) a malonate functional compound.

6. The coated conduit according to any of aspects 1 to 5, wherein the reactive component comprises a) an isocyanate functional compound and b) an amine functional compound, wherein the isocyanate-functional compound comprises a prepolymer prepared from a polyetheramine chain extended with a polyisocyanate.

7. The coated conduit according to aspect 6, wherein the polyisocyanate used to chain extend the polyetheramine comprises isophorone diisocyanate.

8. The coated conduit according to any of aspects 6 to 7, wherein the amine-functional compound b) comprises a primary amine and/or a secondary amine.

9. The coated conduit according to any of aspects 1 to 8, wherein the filler material i) comprises chopped glass fibers, carbon fibers, and/or cellulose fibers.

10. The coated conduit according to any of aspects 1 to 9, wherein the fibers are coated with a sizing.

11. The coated conduit according to any of aspects 1 to 9, wherein the filler material i) comprises corrosion resistant glass fibers.

12. The coated conduit according to any of aspects 1 to 11, wherein the filler material is present in the reaction mixture in an amount of 1 to 50 percent by weight, based on the total weight of resin solids in reaction mixture.

13. A method of repairing or reinforcing a conduit, comprising:
   (a) applying a curable coating composition to at least one surface of the conduit, wherein the curable coating composition is formed from a reaction mixture comprising:
   (i) a filler material comprising fibers ranging in length from 0.1 to 15.54 cm and having an aspect ratio of at least 5; and
   (ii) a reactive component that demonstrates a tack-free time of less than five minutes at a temperature of 20 to 25° C.; and
   (b) allowing the curable coating composition to at least partially cure by exposing the composition to ambient conditions.

14. The method according to aspect 13, wherein the curable coating composition is applied to the surface by spraying.

15. The method according to any of aspects 13 to 14, wherein the conduit comprises an underground pipe.

16. The method according to any of aspects 13 to 15, wherein the curable coating composition is applied to the interior surface of the conduit.

17. The method according to any of aspects 13 to 16, wherein the curable coating composition is applied to the exterior surface of the conduit.

18. The method according to any of aspects 13 to 17, wherein the reactive component comprises:
   (i) a) an isocyanate functional compound and b) an amine functional compound;
   (ii) a) an isocyanate functional compound and b) a hydroxyl functional compound;
   (iii) a) an acid-functional compound and b) an epoxide functional compound;
   (iv) a) an ethylenically unsaturated compound and b) an amine functional compound;
   (v) a) cyclic carbonate functional compound and b) an amine functional compound;
   (vi) a) an acetoacetate functional compound and b) an amine functional compound;
   (vii) a) an epoxide functional compound and b) an amine functional compound;
   (viii) a) a thiol functional compound and b) an ethylenically unsaturated compound; or
   (ix) a) an ethylenically unsaturated compound and b) a malonate functional compound.

19. The method according to any of aspects 13 to 18, wherein the reactive component comprises a) an isocyanate functional compound and b) an amine functional compound, wherein the isocyanate-functional compound comprises a prepolymer prepared from a polyetheramine chain extended with a polyisocyanate.

20. The method according to aspect 19, wherein the polyisocyanate used to chain extend the polyetheramine comprises isophorone diisocyanate.

21. The method according to any of aspects 19 to 20, wherein the amine-functional compound comprises a primary amine and/or a secondary amine.

22. The method according to any of aspects 13 to 21, wherein the filler material (i) comprises chopped glass fibers, carbon fibers, and/or cellulose fibers.

24. The method according to any of aspects 13 to 22, wherein the fibers are coated with a sizing.

25. The method according to any of aspects 13 to 22, wherein the filler material (i) comprises corrosion resistant glass fibers.

26. The method according to any of aspects 13 to 25, wherein the filler material (i) is present in the curable coating composition in an amount of 1 to 50 percent by weight, based on the total weight of resin solids in the curable coating composition.

27. Use of a reaction mixture as defined in any of aspects 1 or 5 to 12 for repairing or reinforcing a conduit, by a method according to any of aspects 13 to 26.

The following examples are intended to illustrate the invention, and should not be construed as limiting the invention in any way.

EXAMPLES

Example A

| Isocyanate Functional Compound | |
|---|---|
| Ingredients | Weight (grams) |
| ISOPHORONE DIISOCYANATE[1] | 1649.9 |
| ARCOL POLYOL PPG-725[2] | 2781.1 |
| DIBUTYLTIN DILAURATE | 0.3 |
| DESMODUR XP2580[3] | 1392.0 |
| DESMODUR XP2410[4] | 4176.8 |

[1]Available from Covestro.LLC
[2]Polyether polyol prepared from propylene glycol, available from Covestro, LLC
2XP2580 aliphatic polyisocyanate; HDI-based trimer available from Covestro, LLC
3XP2410 Low viscous HDI-based asymmetric trimer available from Covestro, LLC A total of 1649.9 grams of isophorone diisocyanate and 2781.1 grams of ARCOL Polyol PPG-725, were added to a suitable reaction vessel equipped with a stirrer, temperature probe, condenser and a nitrogen cap. The contents of the flask were mixed well. Then 0.3 grams of dibutyltin dilaurate was added to the mixture. The contents were slowly heated to 80° C. The contents underwent an exotherm to 100° C. The reaction was held at 100° C. for 1.5 hours. The isocyanate equivalent weight of the contents was then measured and found to be approximately 580 grams/equivalent. The temperature of the reaction mixture was lowered to 80° C. Finally, 1392.0 grams of DESMODUR XP2580 and 4176.8 grams of DESMODUR XP2410 were added to the reaction mixture. The contents of the reactor were cooled and poured out. The final material had a measured solids of 98% (By measuring the weight of a sample before and after being held at 110° C. for one hour) and an isocyanate equivalent weight of approximately 260 grams/equivalent.

Example B

| Amine Functional Compound | |
|---|---|
| Ingredients | Weight (grams) |
| Desmophen NH 1220[1] | 3300.00 |
| Jeffamine T5000[2] | 3194.00 |
| Polyclear 136[3] | 2376.00 |
| Byk-9077[4] | 60.00 |
| Bentone 34[5] | 125.00 |
| Aerosil 200[6] | 125.00 |
| VULCAN XC72 BEAD FORM[7] | 120.00 |
| R-960-09 HIGH GLOSS NEUTRAL pH TiO$_2$[8] | 700.00 |

[1]N,N'-(2-methyl-1,5-pentanediyl)bis-aspartic acid 1,1',4,4'-tetraethyl ester, CAS # 168253-59-6, available from Covestro LLC
[2]Trifunctional polyetheramine with primary amine groups, available from Huntsman Corp.
[3]Reaction product of isophorone diamine and acrylonitrile available from Hanson Group LLC
[4]Wetting and dispersing additive available from BYK Additives and Instruments
[5]Organic derivative of bentonite clay available from Elementis Specialties
[6]Fumed silica available from Evonik Degussa
[7]Black pigment available from Cabot Blacks
[8]White pigment available from E. I. Dupont de Nemours The ingredients listed in the above table were combined and charged to a Premier Mill HM 1.5 VSD Series Super-Mill (available from SPX Corporation) with an 85 percent charge of 1.0 mm Mill Mates Plus TZP grind medium (available from Zircoa, Inc.) and ground at a mill speed of 2400 rpm. The grinds were judged to be complete when the particle size was found to be 7.5 Hegman upon drawdown on a fineness of grind gauge.

Example C

Coating for Glass Fibers

A sizing formulation was prepared with the raw materials as shown in the table below using the following procedure. With a main mix tank set to 77° F., approximately 60 gallons of cold water (60-80° F.) was added followed by the careful addition of hydrochloric acid. The specified amount of silane was added to the main mix tank and allowed to stir for 20 minutes or until a clear solution was attained.

To prepare the titanate pre-mix, three gallons of cold water (60-80° F.) were added to a pre-mix tank. The specified amount of titanacetylacetonate was added followed by the careful addition of the specified amount of hydrochloric acid. The mixture was agitated for 5 minutes and transferred to the main mix tank.

To prepare the lubricant solution, the specified amount of lubricant was added to a pre-mix tank and agitated. Three gallons of hot water (140-160° F.) were slowly added to the lubricant and allowed to stir for 15 minutes. The specified amount of hydrochloric acid was carefully added. The mixture was allowed to agitate for 5 minutes and transferred to the main mix tank.

The specified amount of polyvinylacetate was added directly to the main mix tank and then diluted to a final volume of one hundred gallons. The sizing composition had a pH and final solids content corresponding to the values found in the table below.

| Component | Binder, g |
|---|---|
| HCl (37%) | 80 (0%) |
| Gamma-methacryloxypropyltrimethoxysilane[1] | 654 (1.1%) |

-continued

| Component | Binder, g |
|---|---|
| Titanacetylacetonate | 5594 (7.8%) |
| HCl (37%) | 727 (0%) |
| Fatty acid amide solubilized in acid[2] | 1511 (3.1%) |
| HCl (37%) | 677 (0%) |
| Polyvinylacetate[3] | 74209 (87.9%) |
| Final solids % by weight | 12 |
| Mix pH | 3.10 |

[1]Available from Momentive Performance Chemicals
[2]Available from Daemar, Inc. as OMEGA 16407/FIBERLUBE 1575
[3]Available from Celanese Emulsion Polymers as VINAMUL 8823/FULATEX PD-2147C Examples 1 and 2

A cured in place pipe composition was prepared by mixing together the following ingredients with and without chopped fiber glass coated with the sizing composition of Example C by cylindrical kiss rolling. This mixture was a 2-component blend comprising an amine functional compound and an isocyanate-functional compound.

Example 1 with Glass Fibers

| Ingredient | Amount |
|---|---|
| Amine Functional compound of Example B | 1 by volume |
| Isocyanate Functional Compound of Example A | 1 by volume |
| Glass Fibers coated with sizing of Example C | 26.8% by weight |

Example 2 (Comparative) without Glass Fibers

| Ingredient | Amount |
|---|---|
| Amine Functional compound of Example B | 1 by volume |
| Isocyanate Functional Compound of Example A | 1 by volume |

Polyurea coating compositions of the invention were prepared by combining an isocyanate functional compound and an amine functional compound, then tested in the following manners. The results are reported in Table 1.

Free films of the polyurea coating compositions were produced by using a two-component impingement system with a Graco chopper gun mounted to the top, which simultaneously chops and sprays glass fiber roving into the atomized polyurea spray. Free films are formed by spraying the components at a 1:1 volume ratio onto a polyethylene sheet. Before testing the film properties (Young's Modulus, elongation, Film Thickness (mm), Flexural Strength (PSI), Flexural Modulus of Elasticity (PSI), and Shore D Hardness), the film was allowed to set for 1 day at ambient temperature (about 23° C.) followed by 3 days at 140° F. (60° C.).

Modulus and elongation properties were measured using an INSTRON 4443 with a pull rate of 50 mm/min at room temperature (23° C.) and low temperature (less than −20° C.) to determine low temperature performance.

Hardness values were determined by charging the isocyanate and amine components in a double barreled syringe equipped with a static mix tube and a pneumatic applicator gun and injecting the components at a 1:1 ratio into a mold to form a round "puck" of approximately 6 cm in diameter and 0.2 cm in thickness. The puck was tested after setting for 1 day at ambient temperature followed by 1 day at 140° F. The hardness of the polyurea coating puck was measured with a Shore D Durometer (Pacific Transducer Corp. Model 212) at ambient conditions. Tack-free time was measured once the drawdown was complete: a cotton ball was placed on the surface of the film and checked every 30 seconds until the cotton stopped adhering to the surface of the film. Once the cotton stopped adhering to the surface this was designated as the tack free time.

TABLE 1

| Test | Example 1 | Example 2 (Comparative) |
|---|---|---|
| Young's Modulus (PSI) | 99674 | 28183 |
| Tensile Strain at Break (%) (elongation) | 24.75 | 206.04 |
| Film Thickness (mm) | 3.33 | 1.84 |
| Flexural Strength (PSI) | 6923 | 2426 |
| Flexural Modulus of Elasticity (PSI) | 279022 | 62083 |
| Shore D Hardness | 61.2 | 55.3 |
| Tack Free Time (minutes) | 2 | 2 |

Examples 3 and 4

A cured-in-place pipe composition was prepared by mixing together the following ingredients. The mixture is an aromatic amine-isocyanate blend with an amine/isocyanate equivalent ratio of 1.20, with (Example 3) and without (Comparative Example 4) the addition of 5 percent by weight ground fiber glass on total resin solids. The formulations are shown below.

Example 3 (Aromatic Formulation w/Ground Fiber Glass)

| Name | Parts by Weight |
|---|---|
| Desmophen NH 1420[1] | 44.21 |
| Jeffamine D2000[2] | 7.94 |
| Polyclear 136 | 18.51 |
| Desmophen NH 1220 | 19.84 |
| Byk-9077 | 0.50 |
| Cabosil TS 720[3] | 4.00 |
| Owens Corning Ground Fiber Glass | 5.00 |
| MP 190 (NCO)[4] | 110 |

[1]N,N'-(methylenedi-4,1-cyclohexanediyl)bis-aspartic acid1,1',4,4'-tetraethyl ester, CAS # 136210-30-5, available from Covestro LLC
[2]polyoxypropylene diamine, CAS # 9046-10-0, available from Huntsman Corp.
[3]Fumed silica which has been surface treated with polydimethylsiloxane (PDMS), available from Cabot Corporation
[4]diphenylmethane diisocyanate prepolymer, commercially available from Covestro LLC Example 4 (Comparative) (Aromatic Formulation w/o Ground Fiber Glass)

| Name | Parts by Weight |
|---|---|
| Desmophen NH 1420 | 52.96 |
| Jeffamine D2000 | 8.68 |
| Polyclear 136 | 14.31 |
| Desmophen NH 1220 | 19.54 |
| Byk-9077 | 0.50 |
| Cabosil TS 720 | 4.00 |
| MP 190 (NCO) | 115 |

The aromatic formulations were sprayed using a pneumatic 2-cartridge static mixing nozzle, with the amine component in one cartridge and the isocyanate component in the second cartridge. The formulation was sprayed into a mold in order to form the "dog bone" shape necessary for testing. After spraying, samples were left to sit until a tack-free cure was obtained. Samples were then removed from the sample mold and placed in a 140° F. hot room for 15 hours, allowed to cool for 1 hour, and placed in a 160° F. hot room for an additional 31 hours. The total time the samples spent in a hot room was 46 hours. Samples were an average of 3.2 mm thick and 13.2 mm wide. Modulus and elongation properties were measured using an INSTRON 4443 with a pull rate of 50 mm/min at room temperature (23° C.). Modulus and elongation results are shown in Table 2.

TABLE 2

| Formula | Additive | Fiber glass | Flexural Modulus (PSI) | Flexural Strength (PSI) | Tensile Modulus Cursor (PSI) | Tensile Strain (ext at break) [%] | Maximum Tensile Stress (PSI) |
|---|---|---|---|---|---|---|---|
| Aromatic | 4% Cabosil | 5% Ground | 262626 | 9486 | — | — | — |
| Aromatic | 4% Cabosil | None | 144859 | 6743 | 76839.54 | 5.62 | 2860.14 |

The aromatic formulation with the addition of 5% ground fiber glass (Example 3) showed a flexural modulus of 262,626 PSI, nearly double the aromatic without ground fiber glass (Example 4). The aromatic formulation of the present invention (Example 3) showed an increase in flexural strength (compared to the aliphatic formulation of the present invention—Example 1) to 9486 PSI.

Whereas particular examples of this invention have been described above for purposes of illustration, it will be evident to those skilled in the art that numerous variations of the details of the present invention may be made without departing from the invention as defined in the claims.

What is claimed is:

1. A coated conduit, comprising:
   a) a conduit having an interior and exterior surface; and
   b) a cured coating formed from a reaction mixture that is applied to at least one surface of the conduit, wherein the reaction mixture comprises:
   i) a filler material comprising fibers ranging in length from 0.1 to 15.54 cm and having an aspect ratio of at least 5; and
   ii) a reactive component that demonstrates a tack-free time of less than five minutes at a temperature of 20 to 25° C.

2. The coated conduit of claim 1, wherein the conduit comprises an underground pipe.

3. The coated conduit of claim 1, wherein the reaction mixture is applied to the interior surface of the conduit.

4. The coated conduit of claim 1, wherein the reaction mixture is applied to the exterior surface of the conduit.

5. The coated conduit of claim 1, wherein the reactive component comprises:
   (i) a) an isocyanate functional compound and b) an amine functional compound;
   (ii) a) an isocyanate functional compound and b) a hydroxyl and/or thiol functional compound;
   (iii) a) an acid-functional compound and b) an epoxide functional compound;
   (iv) a) an ethylenically unsaturated compound and b) an amine functional compound;
   (v) a) cyclic carbonate functional compound and b) an amine functional compound;
   (vi) a) an acetoacetate functional compound and b) an amine functional compound;
   (vii) a) an epoxide functional compound and b) an amine functional compound;
   (viii) a) a thiol functional compound and b) an ethylenically unsaturated compound; or
   (ix) a) an ethylenically unsaturated compound and b) a malonate functional compound.

6. The coated conduit of claim 5, wherein the reactive component comprises (i) a) an isocyanate functional compound and b) an amine functional compound, wherein the isocyanate-functional compound comprises a prepolymer prepared from a polyetheramine and/or polyether polyol chain extended with a polyisocyanate.

7. The coated conduit of claim 6, wherein the polyisocyanate used to chain extend the polyetheramine and/or polyether polyol comprises isophorone diisocyanate.

8. The coated conduit of claim 6, wherein the amine-functional compound b) comprises a primary amine and/or a secondary amine.

9. The coated conduit of claim 1, wherein the filler material i) comprises chopped glass fibers, carbon fibers, and/or cellulose fibers.

10. The coated conduit of claim 9, wherein the fibers are coated with a sizing.

11. The coated conduit of claim 1, wherein the filler material i) comprises corrosion resistant glass fibers.

12. The coated conduit of claim 1, wherein the filler material is present in the reaction mixture in an amount of 1 to 50 percent by weight, based on the total weight of resin solids in reaction mixture.

13. The coated conduit of claim 5, wherein the reactive component comprises (ii) a) an isocyanate functional compound and b) a hydroxyl and/or thiol functional compound.

14. The coated conduit of claim 5, wherein the reactive component comprises (iii) a) an acid-functional compound and b) an epoxide functional compound.

15. The coated conduit of claim 5, wherein the reactive component comprises (iv) a) an ethylenically unsaturated compound and b) an amine functional compound.

16. The coated conduit of claim 5, wherein the reactive component comprises (v) a) cyclic carbonate functional compound and b) an amine functional compound.

17. The coated conduit of claim 5, wherein the reactive component comprises (vi) a) an acetoacetate functional compound and b) an amine functional compound.

18. The coated conduit of claim 5, wherein the reactive component comprises (vii) a) an epoxide functional compound and b) an amine functional compound.

19. The coated conduit of claim 5, wherein the reactive component comprises (viii) a) a thiol functional compound and b) an ethylenically unsaturated compound.

20. The coated conduit of claim 5, wherein the reactive component comprises (ix) a) an ethylenically unsaturated compound and b) a malonate functional compound.

* * * * *